United States Patent
Carbonelli et al.

(10) Patent No.: US 12,236,973 B2
(45) Date of Patent: Feb. 25, 2025

(54) CLASSIFICATION SYSTEM AND METHOD FOR CLASSIFYING AN EXTERNAL IMPACT ON A WINDOW OR ON AN ACCESS OPENING OF AN ENCLOSED STRUCTURE

(71) Applicant: Infineon Technologies AG, Neubiberg (DE)

(72) Inventors: Cecilia Carbonelli, Munich (DE); Andrea Heinz, Munich (DE)

(73) Assignee: Infineon Technologies AG, Neubiberg (DE)

( * ) Notice: Subject to any disclaimer, the term of this patent is extended or adjusted under 35 U.S.C. 154(b) by 123 days.

(21) Appl. No.: 17/112,230

(22) Filed: Dec. 4, 2020

(65) Prior Publication Data
US 2021/0224618 A1    Jul. 22, 2021

(30) Foreign Application Priority Data
Jan. 22, 2020    (EP) .................................. 20153226

(51) Int. Cl.
*G10L 25/51*    (2013.01)
*G01D 21/02*    (2006.01)
*G06F 18/25*    (2023.01)

(52) U.S. Cl.
CPC .............. *G10L 25/51* (2013.01); *G01D 21/02* (2013.01); *G06F 18/253* (2023.01); *G06F 18/256* (2023.01)

(58) Field of Classification Search
CPC .... G06K 9/6293; G06K 9/629; G06K 9/0053; G06K 9/6268; G06K 9/6277;
(Continued)

(56) References Cited

U.S. PATENT DOCUMENTS

| | | | |
|---|---|---|---|
| 9,940,825 B2 | 4/2018 | Khazanov et al. | |
| 2005/0238238 A1* | 10/2005 | Xu | G06F 16/7834 704/231 |

(Continued)

FOREIGN PATENT DOCUMENTS

| | | | |
|---|---|---|---|
| CN | 202209524 U | * | 5/2012 |
| CN | 110334243 A | | 10/2019 |

(Continued)

OTHER PUBLICATIONS

K. Ohara and et al, Detecting State Changes of Indoor Everyday Objects using Wi-Fi Channel State Information, Proceedings of the ACM on Interactive, Mobile, Wearable and Ubiquitous Technologies vol. 1Issue 3Sep. 2017 (Year: 2017).*

(Continued)

*Primary Examiner* — Douglas Kay
(74) *Attorney, Agent, or Firm* — Harrity & Harrity, LLP

(57) ABSTRACT

In accordance with an embodiment, a system includes: an audio signal pre-processor; a pressure signal pre-processor; an audio signal feature processor; a pressure signal feature processor; a feature combining processor; and a classification processor configured for classifying the external impact on a window or access opening of an enclosed structure by classifying an audio feature and pressure feature vector in order to produce a classification output; wherein the classification processor is configured for executing a first machine learning algorithm, wherein the audio feature and pressure feature vector is fed to an input layer of the first machine learning algorithm, and wherein the classification output is based on an output of the first machine learning algorithm.

34 Claims, 12 Drawing Sheets

(58) Field of Classification Search
CPC .... G06K 9/6267; G01D 21/02; G06N 3/0481; G06N 3/084; G06N 3/0454; G06N 3/0472; G06N 3/08; G06N 20/00; G10L 25/30; G10L 25/51; G10L 25/03; G01L 19/00; G01L 19/08; G06V 10/469
See application file for complete search history.

(56) References Cited

U.S. PATENT DOCUMENTS

| | | | | |
|---|---|---|---|---|
| 2010/0004926 | A1* | 1/2010 | Neoran | G10L 25/48 704/201 |
| 2016/0140956 | A1* | 5/2016 | Yu | G10L 15/08 704/240 |
| 2017/0262478 | A1* | 9/2017 | Zepeda Salvatierra | G06V 10/464 |
| 2019/0057715 | A1* | 2/2019 | Saund | G10L 25/48 |
| 2019/0265121 | A1 | 8/2019 | Grutta et al. | |
| 2019/0362614 | A1* | 11/2019 | Mandl | G10L 25/51 |
| 2020/0151516 | A1* | 5/2020 | Anushiravani | G16H 70/60 |
| 2020/0250270 | A1* | 8/2020 | Yu | G06F 40/126 |
| 2020/0372291 | A1* | 11/2020 | Dey | G06T 19/00 |
| 2021/0012769 | A1* | 1/2021 | Vasconcelos | G10L 15/22 |
| 2021/0133494 | A1* | 5/2021 | Komatsu | G06F 18/214 |
| 2021/0136681 | A1* | 5/2021 | Mai | G08B 29/188 |
| 2021/0244377 | A1* | 8/2021 | Amoh | A61B 5/7257 |
| 2021/0311162 | A1* | 10/2021 | Mai | G01S 7/415 |
| 2021/0381861 | A1* | 12/2021 | Brown | G05D 22/02 |
| 2021/0383538 | A1* | 12/2021 | Deasy | A61B 6/5211 |
| 2022/0101125 | A1* | 3/2022 | Krompaß | G06N 3/084 |
| 2022/0253699 | A1* | 8/2022 | Hoshen | G06N 3/08 |

FOREIGN PATENT DOCUMENTS

| | | | | |
|---|---|---|---|---|
| CN | 110600054 | A | | 12/2019 |
| CN | 112286901 | A * | | 1/2021 |
| EP | 3573031 | A1 | | 11/2019 |
| JP | 2006258463 | A * | | 9/2006 |
| JP | 2010182287 | A * | | 8/2010 |
| KR | 20160095901 | A * | | 8/2016 |
| TW | I645376 | B | | 12/2018 |
| WO | WO-2016109838 | A1 * | 7/2016 | G01J 5/025 |

OTHER PUBLICATIONS

W. Z. Kahn and et al, "Mobile Phone Sensing Systems: A Survey", IEEE communications surveys & tutorials, vol. 15, No. 1, First quarter 2013 (Year: 2013).*

V. Radu and et al, "Multimodal Deep Learning for Activity and Context Recognition", Proceedings of the ACM on Interactive, Mobile, Wearable and Ubiquitous Technologies, vol. 1, No. 4, Article 157. Publication date: Dec. 2017 (Year: 2017).*

J. Tang and et al , "Extreme Learning Machine for Multilayer Perceptron", IEEE Transactions on neural networks and learning systems, vol. 27, No. 4, Apr. 2016 (Year: 2016).*

* cited by examiner

CLASSIFICATION SYSTEM AND METHOD FOR CLASSIFYING AN EXTERNAL IMPACT ON A WINDOW OR ON AN ACCESS OPENING OF AN ENCLOSED STRUCTURE

This application claims the benefit of European Patent Application No. 20153226.4, filed on Jan. 22, 2020, which application is hereby incorporated herein by reference in its entirety.

TECHNICAL FIELD

Embodiments relate to a classification system for classifying an external impact on a window or on an access opening of an enclosed structure. Further embodiments relate to a method for classifying an external impact on a window or on an access opening of an enclosed structure. More particular, the disclosure deals with the classification of an external impact on a window or on an access opening of an enclosed structure using an audio signal from a microphone and a pressure signal from a barometric pressure sensor.

BACKGROUND

There exist several types of systems that can detect the presence of an intruder in an indoor environment. They are mostly based on motion sensors (e.g., infrared or magnetic sensors), contact sensors mounted to windows and doors or glass break sensors—either vibration based and directly applied to each glass pane of a window or door—which can supervise several windows in a room. Image sensors and cameras are also an option.

The signal measured at a barometric pressure sensor or at a microphone sensor can be seen as a simpler (less installation effort) and cheaper alternative to the approaches mentioned above which however makes use of advance machine learning techniques and neural network architectures to boost performance over more conventional methods.

As far as the specific detection algorithm is concerned, a simple state-of-the art approach based on a combination of sensor signals (including a barometer) and thresholds is disclosed in U.S. Pat. No. 9,940,825 B2. Due to its simplicity, this approach has the drawback of not being able to distinguish between different types of events (such as opening or tilting of a window or window crashing) and is prone to generate a too high number of false alarms.

A more complex approach consists of applying a Hidden Markov Model to the collected pressure sensor signals. This method requires the identification of the different states and transition probabilities from one state to the other which turns out to be quite challenging if different type of opening events needs to be classified (window open/tilted, door open, etc.) and the use of a simpler probabilistic model becomes thus more attractive.

As far as sensor fusion is concerned, a simple combination of pressure and microphone sensors has been also proposed in EP 3 573 031 A1, where a majority rule is applied to the final output of a basic threshold-based algorithm running on signals of a pressure sensors and on signals on of a microphone.

Such an approach, despite its simplicity, does not make an efficient and judicious use of the two available streams and compromises classification performance.

SUMMARY

In accordance with an embodiment, a system includes an audio signal pre-processor configured receive an audio signal from a microphone and to derive a pre-processed audio signal from a received audio signal; a pressure signal pre-processor configured to receive a pressure signal from a barometric pressure sensor and to derive a pre-processed pressure signal from the received pressure signal; an audio signal feature processor configured for extracting audio features from the pre-processed audio signal in order to produce an audio feature vector; a pressure signal feature processor configured for extracting pressure features from the pre-processed pressure signal in order to produce a pressure feature vector; a feature combining processor configured for combining the audio feature vector and the pressure feature vector in order to produce an audio feature and pressure feature vector; and a classification processor configured for classifying the external impact on the window or the access opening by classifying the audio feature and pressure feature vector in order to produce a classification output. The classification processor is configured for executing a first machine learning algorithm, wherein the audio feature and pressure feature vector is fed to an input layer of the first machine learning algorithm, and wherein the classification output is based on an output of the first machine learning algorithm.

In accordance with another embodiment, a method for classifying an external impact on a window or on an access opening of an enclosed structure includes producing an audio signal corresponding to a sound within the enclosed structure by using a microphone; producing a pressure signal corresponding to an air pressure within the enclosed structure by using a barometric pressure sensor; deriving a pre-processed audio signal from the audio signal by using an audio signal pre-processor; deriving a pre-processed pressure signal from the pressure signal by using a pressure signal pre-processor; extracting audio features from the pre-processed audio signal by using an audio signal feature processor in order to produce an audio feature vector; extracting pressure features from the pre-processed pressure signal by using a pressure signal feature processor in order to produce a pressure feature vector; combining the audio feature vector and the pressure feature vector by using a feature combining processor in order to produce an audio feature and pressure feature vector; and classifying the external impact on the window or the access opening by classifying the audio feature and pressure feature vector by using a classification processor in order to produce a classification output. The classification processor is executes a first machine learning algorithm, wherein the audio feature and pressure feature vector is fed to an input layer of the first machine learning algorithm, and wherein the classification output is based on an output of the first machine learning algorithm.

BRIEF DESCRIPTION OF THE DRAWINGS

Preferred embodiments of the invention are subsequently discussed with respect to the accompanying drawings, in which.

Figure 1:
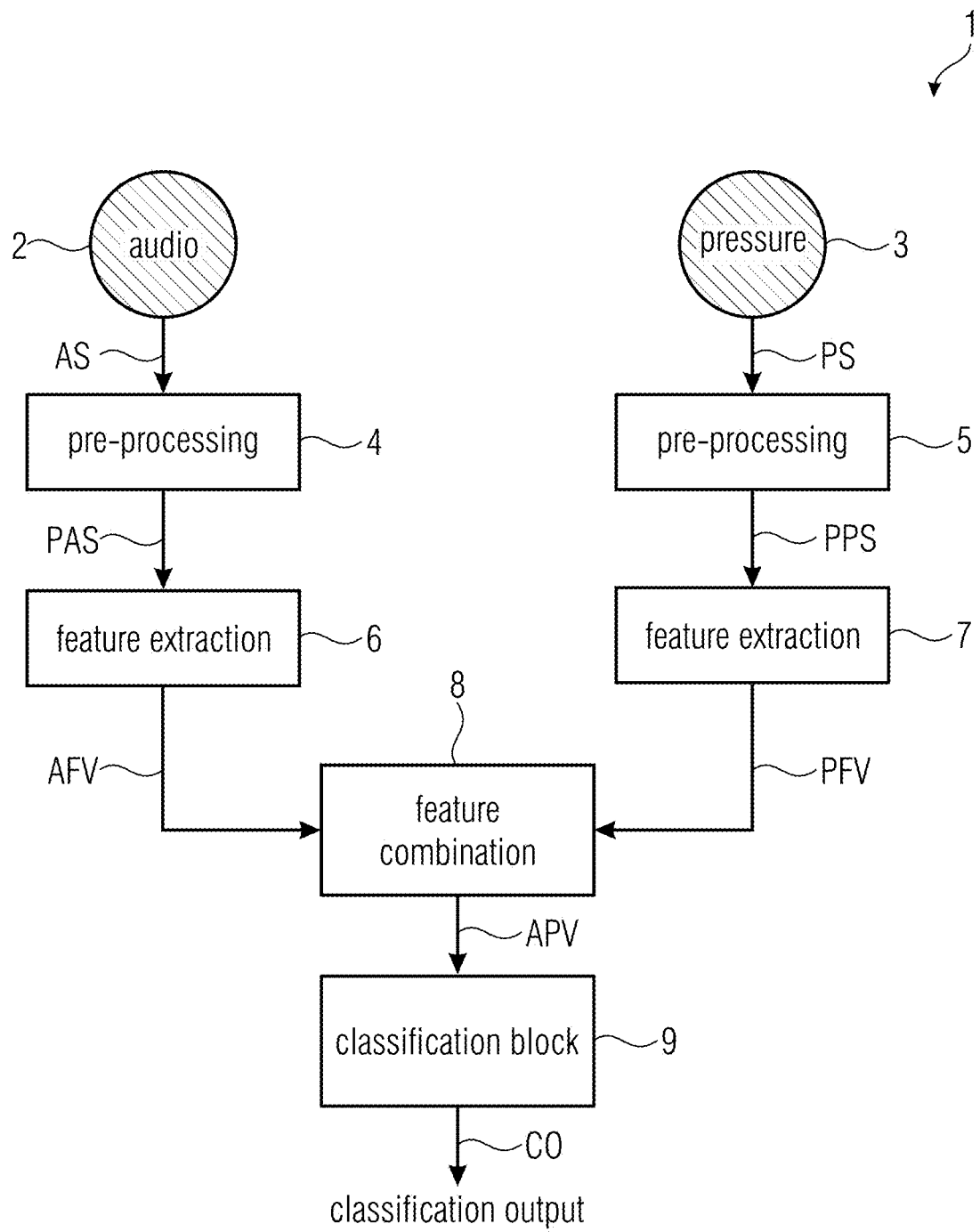
FIG. 1 shows a schematic view of a first embodiment of a classification system for classifying an external impact on a window or on an access opening of an enclosed structure according to the disclosure.

Equal or equivalent elements or elements with equal or equivalent functionality are denoted in the following description by equal or equivalent reference numerals.

DETAILED DESCRIPTION OF ILLUSTRATIVE EMBODIMENTS

In the following description, a plurality of details is set forth to provide a more thorough explanation of embodiments of the present disclosure. However, it will be apparent to those skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

Disclosed is a classification system for classifying an external impact on a window or on an access opening of an enclosed structure. The classification system comprises: a microphone configured for producing an audio signal corresponding to a sound within the enclosed structure; a barometric pressure sensor configured for producing a pressure signal corresponding to an air pressure within the enclosed structure; an audio signal pre-processor configured for deriving a pre-processed audio signal from the audio signal; a pressure signal pre-processor configured for deriving a pre-processed pressure signal from the pressure signal; an audio signal feature processor configured for extracting audio features from the pre-processed audio signal in order to produce an audio feature vector; a pressure signal feature processor configured for extracting pressure features from the pre-processed pressure signal in order to produce a pressure feature vector; a feature combining processor configured for combining the audio feature vector and the pressure feature vector in order to produce an audio feature and pressure feature vector; and a classification processor configured for classifying the external impact on the window or the access opening by classifying the audio feature and pressure feature vector in order to produce a classification output; wherein the classification processor is configured for executing a first machine learning algorithm, wherein the audio feature and pressure feature vector is fed to an input layer of the first machine learning algorithm, and wherein the classification output is based on an output of the first machine learning algorithm.

The classification system according to the disclosure is based on a multiple-stream method, which combines data from sensors of different nature in a common network architecture to enhance each stream with the knowledge from the other stream at an early stage of the processing flow.

The term "classifying an external impact on a window or on an access opening of an enclosed structure" refers to a detection of a nature of an externally induced event having an influence on the window or on the access opening of the enclosed structure. The classes may comprise:
a) window or access opening is being opened;
b) window or access opening has been closed;
c) window or access opening has been hit;
d) window or access opening has been damaged, e.g. a glass break has occurred;
e) window or access opening has been slammed.

The enclosed structure may be for example a building, a portion of a building, e.g. a room, a vehicle or a part of a vehicle, such as a passenger compartment. The access opening may a door, a luggage compartment lid or the like.

The term processor refers to an electronic device configured for specific task. A processor may comprise hardware or a combination of hardware and software. Different processors may share hardware components and/or software components. In some embodiments, the processor may include a central processing unit (CPU), and a non-transitory computer readable medium, such as a memory, on which instructions or program code executable by the CPU are stored. The processor may be implemented using processor circuitry known in the art including, but not limited to a microprocessor, microcontroller, or dedicated digital signal processing circuitry. Specialized hardware configured to implement, for example, neural networks may also be used in some embodiments.

The audio signal feature processor may be configured for transforming the audio signal into audio feature vectors, wherein the audio feature vector comprises values of features which are characteristic for the audio signal. Some of the features may correspond to the absolute value of the mean deviation of the respective audio signal, to the phase of the mean deviation of the respective audio signal, to the absolute value of the standard deviation of the respective audio signal or to the phase of the standard deviation of the respective audio signal. Also considered may be the maximum, the minimum, dynamic moments, the dynamic moments of the first derivative or meta features, like kurtosis, skewness or quantile, of the audio signal.

In the same way, the pressure signal feature processor may be configured for transforming the pressure signal into pressure feature vectors, wherein the pressure feature vector comprises values of features which are characteristic for the pressure signal. Some of the features may correspond to the absolute value of the mean deviation of the respective pressure signal, to the phase of the mean deviation of the respective pressure signal, to the absolute value of the standard deviation of the respective pressure signal or to the phase of the standard deviation of the respective pressure signal. Also considered may be the maximum, the minimum, the dynamic moments, the dynamic moments of the first derivative or meta features, like kurtosis, skewness or quantile, of the pressure signal.

The feature combining processor combines the audio feature vector and the pressure feature vector in order to produce an audio feature and pressure feature vector, which the is fed to the classification processor.

In particular, the audio feature and pressure feature vector is fed to an input layer of the first machine learning algorithm and the classification output is based on an output of the first machine learning algorithm.

The term "machine learning algorithm" refers to all statistical models that computer systems use to perform a specific task without using explicit instructions, relying on patterns and inference instead. The structure of the machine learning algorithm usually is predefined. However, the parameters of the machine learning algorithm usually are learned during a preoperational learning phase and/or during the operational phase.

It has to be noted that the proposed techniques are flexible enough to be able to incorporate further sensor signals such as sensor signals from radar or environmental sensors in addition to the signals from the barometric pressure sensor and the microphone as discussed herein.

The core of the disclosure is a mechanism for the classification of signals from multiple sources based on fusing the different streams at an early stage of the processing flow. Specifically, the signals are measured at a microphone and at a pressure sensor with the final goal of recognizing an impact on a window or on an access opening of an enclosed structure. The proposed classification system comprises: a plurality of feature extraction processors wherein each of the feature extraction processors is implemented to extract or learn the discriminative properties of one of the signals based on the specific nature of the respective signal and enables efficient reuse of subsequent network layers; a feature combining processor, which judiciously combines the features from the multiple streams and whose parameters optionally are optimized together with the other network parameters; and a classification processor comprising a first machine learning algorithm, which outputs in a supervised manner a decision on the event which has been observed.

The combination of the features of the audio signal and the features of pressure signal before the features are fed to the first machine learning algorithm provide a higher classification accuracy compared to solutions in which the features of the audio signal and the features of the pressure signal are classified independently from each other.

According to some embodiments the audio signal pre-processor comprises an audio signal normalization processor configured for normalizing the audio signal, and/or the pressure signal pre-processor comprises a pressure signal normalization processor configured for normalizing the pressure signal. Such features further improve the classification accuracy.

According to some embodiments the audio signal pre-processor comprises an audio signal filter configured for filtering the audio signal, and/or the pressure signal pre-processor comprises a pressure signal filter configured for filtering the pressure signal. Each of the filters may, for example, be implemented as a high pass filter or a noise filter. Such features further improve the classification accuracy.

According to some embodiments the audio signal pre-processor comprises an audio signal outlier removing processor configured for removing outliers from the audio signal, and/or the pressure signal pre-processor comprises a pressure signal outlier removing processor configured for removing outliers from the pressure signal. Such features further improve the classification accuracy.

According to some embodiments the audio signal pre-processor comprises an audio signal converter processor configured for providing the pre-processed audio signal as two-dimensional pre-processed audio signal time-frequency maps, and/or the pressure signal pre-processor comprises a pressure signal converter processor configured for providing the pre-processed pressure signal as two-dimensional pre-processed pressure signal time-frequency maps. Each of the signal converter processors may be implemented as a mel-spectrogram algorithm. These features simplify the subsequent determination of features and, thus, improve the classification accuracy.

According to some embodiments the audio signal feature processor is configured for calculating at least a first portion of the audio feature vector by using one or more first explicit formulas, and/or the pressure signal feature processor is configured for calculating at least a first portion of the pressure feature vector by using one or more second explicit formulas. In such embodiments at least a first portion of each of the feature vectors is calculated by predefined formulas, which limits the computational effort compared to embodiments which are solely using adaptive algorithms for calculating each of the feature vectors.

According to some embodiments the first machine learning algorithm is implemented as a first artificial neural network, wherein the classification processor comprises a softmax processor, which is arranged at an output side of the first artificial neural network, and which outputs the classification output.

It has been found that an artificial neural network is more suitable for the classification processor than other machine learning algorithms such as decision trees or the like. The softmax processor is capable of executing a softmax function. The softmax function is used as the final layer of the neural network-based classification processor. In particular, the combination of an artificial neural network and the softmax processor limits the computational effort and provides a high accuracy.

According to some embodiments the first artificial neural network comprises at least one first convolution processor. A convolution processor is a processor which acts as a convolutional neural network. The name "convolutional neural network" indicates that the network employs a mathematical operation called convolution. Convolution is a specialized kind of linear operation. Convolutional networks are simply neural networks that use convolution in place of general matrix multiplication in at least one of their layers.

According to some embodiments the first artificial neural network comprises at least one first convolution batch normalization processor. A convolution batch normalization processor is a processor capable of executing a batch normalization algorithm. Batch normalization is a technique for training very deep neural networks that standardizes the inputs to a layer for each mini-batch. This has the effect of stabilizing the learning process and dramatically reducing the number of training epochs required to train deep networks.

The first convolution processor and the first convolution batch normalization processor may be arranged in parallel, wherein the outputs of the processors are summed up in order to provide the output of the first artificial neural network. These features limit the computational effort and provide a high accuracy.

According to some embodiments the first artificial neural network comprises at least one first rectified linear unit processor. In the context of artificial neural networks, the rectifier is an activation function defined as the positive part of its argument. It has been demonstrated to enable better training of deeper networks, compared to the other activation functions.

According to some embodiments the classification processor comprises at least one first pooling layer processor, which is arranged at the output side of the first artificial neural network. A pooling layer processor layer shapes its inputs to a 1D array, which is suitable for a subsequent softmax layer.

According to some embodiments the classification processor comprises at least one second rectified linear unit processor, which is arranged at the output side of the first artificial neural network. The configuration of the second rectified linear unit processor is similar to the configuration of the first rectified linear unit processor.

According to some embodiments the audio signal feature processor is configured for executing a second machine learning algorithm, wherein at least a second portion of the audio feature vector is provided at an output layer of the second machine learning algorithm, and/or the pressure signal feature processor is configured for executing a third machine learning algorithm, wherein at least a second portion of the pressure feature vector is provided at an output layer of the third machine learning algorithm. In such embodiments the calculation of each of the feature vectors is not solely rely on predefined algorithms, instead the calculation relies at least partially on machine learning algorithms. By these features the calculation of the feature vectors may be adapted to the specific environment of the classification system so that the classification accuracy may be improved.

According to some embodiments the second machine learning algorithm is implemented as a second artificial neural network, and/or the third machine learning algorithm is implemented as a third artificial neural network. The second artificial network and/or the third artificial network may be implemented similarly to the first artificial network.

According to some embodiments the second artificial neural network comprises at least one second convolution processor, and/or the third artificial neural network comprises at least one third convolution processor. The second convolution processor and/or the third convolution processor may be implemented similarly to the first convolution processor.

According to some embodiments the second artificial neural network comprises at least one second convolution batch normalization processor, and/or the third artificial neural network comprises at least one third convolution batch normalization processor. The second convolution batch normalization processor and/or the third convolution batch normalization processor may be implemented similarly to the first convolution batch normalization processor.

According to some embodiments the audio signal feature processor comprises at least one second pooling layer processor at an output side of the second artificial neural network, and/or the pressure signal feature processor comprises at least one third pooling layer processor at an output side of the third artificial neural network. The second pooling layer processor and/or the third pooling layer processor may be implemented similarly to the first pooling layer processor.

According to some embodiments the audio signal feature processor comprises at least one third rectified linear unit processor at an output side of the second artificial neural network, and/or the pressure signal feature processor comprises at least one fourth rectified linear unit processor at an output side of the third artificial neural network. The third rectified linear unit processor and/or the fourth rectified linear unit processor may be implemented similarly to the first rectified linear unit processor.

According to some embodiments the audio signal feature processor comprises at least one fourth convolution processor at an output side of the second artificial neural network, and/or the pressure signal feature processor comprises at least one fifth convolution processor at an output side of the third artificial neural network. The fourth convolution processor and/or the fifth convolution processor may be implemented similarly to the first convolution processor.

According to some embodiments the feature combining processor is configured for producing the audio feature and pressure feature vector by producing a concatenation or a sum or an elementwise multiplication of the audio feature vector and the pressure feature vector.

With $F_a$ being the audio feature vector and $F_p$ being the pressure feature vector out of the two sensor streams—learned or explicitly extracted- and assuming they have been reduced to compatible sizes in the pre-processing and feature extraction steps, we could have various combinations. Possible options for producing the audio feature and pressure feature vector are:
1) a concatenation $[F_a, F_p]$;
2) a sum $[F_a+F_p]$;
3) an elementwise multiplication $[F_a] * [F_p]$ According to some embodiments the feature combining processor is configured for producing the audio feature and pressure feature vector by producing a weighted concatenation or a weighted sum or a weighted elementwise multiplication of the audio feature vector and the pressure feature vector, wherein, by a weight computation processor, a weight for the audio feature vector and a weight for the pressure feature vector is determined depending on the audio feature vector and/or the pressure feature vector.

With $F_a$ being the audio feature vector and $F_p$ being the pressure feature vector of the two sensor streams—learned or explicitly extracted- and assuming they have been reduced to compatible sizes in the pre-processing and feature extraction steps, we could have various combinations. Possible options are:
- a weighted concatenation $[\alpha_a F_a, \beta_p F_p]$ with αa being the weight of the audio feature vector and βp being the weight of the pressure feature vector;
- a weighted sum $[\alpha_a F_a + \beta_p F_p]$ with αa being the weight of the audio feature vector and βp being the weight of the pressure feature vector;
- a weighted elementwise multiplication $[\alpha_a F_a] * [\beta_p F_p]$ with αa being the weight of the audio feature vector and $\beta_p$ being the weight of the pressure feature vector.

The weights allow taking into account that, under certain circumstances, the features of the audio signal may be more distinctive (characteristic) than the features of the pressure signal or vice versa. Thus, the classification accuracy may be improved by allocating a higher weight to the features of the audio signal than to the features of the pressure signal in case that the features of the audio signal are more characteristic than the features of the pressure signal and by allocating a higher weight to the features of the pressure signal than to the features of the audio signal in case that the features of the audio signal are less characteristic than the features of the pressure signal. In this case the weights are, at least partially, determined by the use of a predefined algorithm, which limits the computational effort.

According to some embodiments the feature combining processor is configured for producing the audio feature and pressure feature vector by producing a weighted concatenation or a weighted sum or a weighted elementwise multiplication of the audio feature vector and the pressure feature vector, wherein, by a weight computation processor, a weight for the audio feature vector and a weight for the pressure feature vector is determined depending on a hidden state of the first artificial neural network. In this case the weights are, at least partially, determined by the use of learned data from the first artificial network, which further improves the classification accuracy.

According to some embodiments the feature combining processor is configured for adding a first offset vector to the audio feature vector and/or a second offset vector to the pressure feature vector before producing the audio feature and pressure feature vector, wherein the first offset vector and/or the second offset vector are determined depending on the audio feature vector and/or the pressure feature vector. In this case the offsets are, at least partially, determined by the use of a predefined algorithm, which limits the computational effort. Such features improve the classification accuracy.

According to some embodiments the feature combining processor is configured for adding a first offset vector to the audio feature vector and/or a second offset vector to the pressure feature vector before producing the audio feature and pressure feature vector, wherein the first offset vector and/or the second offset vector are determined depending on a hidden state of the first artificial neural network. In this case the offsets are, at least partially, determined by the use of learned data from the first artificial network, which further improves the classification accuracy. Such features improve the classification accuracy.

Further disclosed is a method for classifying an external impact on a window or on an access opening of an enclosed structure. The method comprises the steps of: producing an audio signal corresponding to a sound within the enclosed structure by using a microphone; producing a pressure signal corresponding to an air pressure within the enclosed structure by using a barometric pressure sensor; deriving a pre-processed audio signal from the audio signal by using an audio signal pre-processor; deriving a pre-processed pressure signal from the pressure signal by using a pressure signal pre-processor; extracting audio features from the pre-processed audio signal by using an audio signal feature processor in order to produce an audio feature vector; extracting pressure features from the pre-processed pressure signal by using a pressure signal feature processor in order to produce a pressure feature vector; combining the audio feature vector and the pressure feature vector by using a feature combining processor in order to produce an audio feature and pressure feature vector; and classifying the external impact on the window or the access opening by classifying the audio feature and pressure feature vector by using a classification processor in order to produce a classification output; wherein the classification processor is executing a first machine learning algorithm, wherein the audio feature and pressure feature vector is fed to an input layer of the first machine learning algorithm, and wherein the classification output is based on an output of the first machine learning algorithm.

Further disclosed is a computer program for implementing, when running on a computer, a method as disclosed herein.

FIG. 1 shows a schematic view of a first embodiment of a classification system 1 for classifying an external impact on a window or on an access opening of an enclosed structure according to the disclosure. The classification system comprises:

a microphone 2 configured for producing an audio signal AS corresponding to a sound within the enclosed structure;

a barometric pressure sensor 3 configured for producing a pressure signal PS corresponding to an air pressure within the enclosed structure;

an audio signal pre-processor 4 configured for deriving a pre-processed audio signal PAS from the audio signal AS;

a pressure signal pre-processor 5 configured for deriving a pre-processed pressure signal PPS from the pressure signal PS;

an audio signal feature processor 6 configured for extracting audio features from the pre-processed audio signal PAS in order to produce an audio feature vector AFV;

a pressure signal feature processor 7 configured for extracting pressure features from the pre-processed pressure signal PPS in order to produce a pressure feature vector PFV;

a feature combining processor 8 configured for combining the audio feature vector AFV and the pressure feature vector PVF in order to produce an audio feature and pressure feature vector APV; and a classification processor 9 configured for classifying the external impact on the window or the access opening by classifying the audio feature and pressure feature vector APV in order to produce a classification output CO;

wherein the classification processor 9 is configured for executing a first machine learning algorithm, wherein the audio feature and pressure feature vector APV is fed to an input layer of the first machine learning algorithm, and wherein the classification output CO is based on an output of the first machine learning algorithm.

According to some embodiments the audio signal pre-processor 4 comprises an audio signal filter configured for filtering the audio signal AS, and/or the pressure signal pre-processor 5 comprises a pressure signal filter configured for filtering the pressure signal PS.

According to some embodiments the audio signal pre-processor 4 comprises an audio signal outlier removing processor configured for removing outliers from the audio signal AS, and/or the pressure signal pre-processor 5 comprises a pressure signal outlier removing processor configured for removing outliers from the pressure signal PS.

According to some embodiments the audio signal feature processor 6 is configured for calculating at least a first portion of the audio feature vector AFV by using one or more first explicit formulas, and/or the pressure signal feature processor 7 is configured for calculating at least a first portion of the pressure feature vector PFV by using one or more second explicit formulas.

According to some embodiments the feature combining processor 8 is configured for producing the audio feature and pressure feature vector APV by producing a concatenation or a sum or an elementwise multiplication of the audio feature vector AFV and the pressure feature vector PFV.

In a further aspect the disclosure refers to a method for classifying an external impact on a window or on an access opening of an enclosed structure. The method comprises the steps of:

producing an audio signal AS corresponding to a sound within the enclosed structure by using a microphone 2;

producing a pressure signal PS corresponding to an air pressure within the enclosed structure by using a barometric pressure sensor 3;

deriving a pre-processed audio signal PAS from the audio signal AS by using an audio signal pre-processor 4;

deriving a pre-processed pressure signal PPS from the pressure signal PS by using a pressure signal pre-processor 5;

extracting audio features from the pre-processed audio signal PAS by using an audio signal feature processor 6 in order to produce an audio feature vector AFV;

extracting pressure features from the pre-processed pressure signal PPS by using a pressure signal feature processor 7 in order to produce a pressure feature vector PFV;

combining the audio feature vector AFV and the pressure feature vector PFV by using a feature combining processor 8 in order to produce an audio feature and pressure feature vector APV; and classifying the external impact on the window or the access opening by classifying the audio feature and pressure feature vector APV by using a classification processor 9 in order to produce a classification output CO;

wherein the classification processor 9 is executing a first machine learning algorithm, wherein the audio feature and pressure feature vector APV is fed to an input layer of the first machine learning algorithm, and wherein the classification output CO is based on an output of the first machine learning algorithm.

In a further aspect the disclosure refers to a computer program for implementing, when running on a computer, a method as discussed herein.

This disclosure deals with the intelligent combinations—sensor fusion—pressure signals PS of a barometric pressure sensor 3 and audio signals AS of a microphone 2 for the identification of specific types of events such as a window or house door being opened or closed or the break of a window glass. In the context of smart home and home scene analysis the identification of such events can be used for instance to detect that a burglar is entering a home or house. Similar events are also relevant for other enclosed environment like cars.

It has been observed that the pressure signal PS measured at a barometric pressure sensor 3 has a characteristic pattern depending on whether a window or a door in the home, where the barometric pressure sensor 3 is placed, is being opened, tilted, broken or similar. The pattern of the pressure signal PS remains distinctive not only in the affected room but also in the whole home as long as doors inside the home are not tightly closed. Similarly, audio signals AS also exhibit a very distinctive behavior when events like slamming, crashing or hitting a window happens near the microphone 2. Nevertheless, the specific patterns recorded at the microphone 2 and at the barometric pressure sensor 3 have different characteristics that—depending on the event—can be more or less pronounced.

According to FIG. 1 the audio signal AS and the pressure signal PS are first separately pre-processed by the audio signal pre-processor and the 4 pressure signal pre-processor 5. This includes, where needed, high pass or noise filtering, signal normalization, outliers' elimination, and so on but also the generation of 2-dimensional time-frequency maps (e.g., a feature map).

As a second step, the pre-processed audio signal PAS is fed to the audio signal feature processor 6 and the pre-processed pressure signal PPS is fed to the feature pressure signal feature processor 7. The signals PAS and PPS are still kept separate to enable a more appropriate and signal specific learning of the discriminative properties of the multiple stream data. The extracted audio feature vector AFV and the extracted pressure feature vector PFV could be the explicit calculation of a certain metric (such as a derivative, a phase, a mean value, etc.) or could be implicitly learned through a separate neural network.

At this point, the extracted audio feature vector AFV and the extracted pressure feature vector PFV can be fused or combined together in order to calculate an audio feature and pressure feature vector APV. This operation can have different implementations, ranging from a simple feature concatenation to a more complex weighted combination with weights (and offsets) being learned with a separate attention mechanism and thus a separate back-propagation process. The choice between the different combination methods will depend on the specific structure the subsequent structure, on its convergence properties and on the nature of the data (and extracted features).

Now, the computed audio feature and pressure feature vector APV is sent to the classification processor 9, which can be implemented as general machine learning classification algorithm or more conveniently as a neural network followed by a softmax layer. The specific network could be a fully combined network or an additional convolutional block depending on what features have been extracted and how they have been combined in the previous steps.

Figure 2:
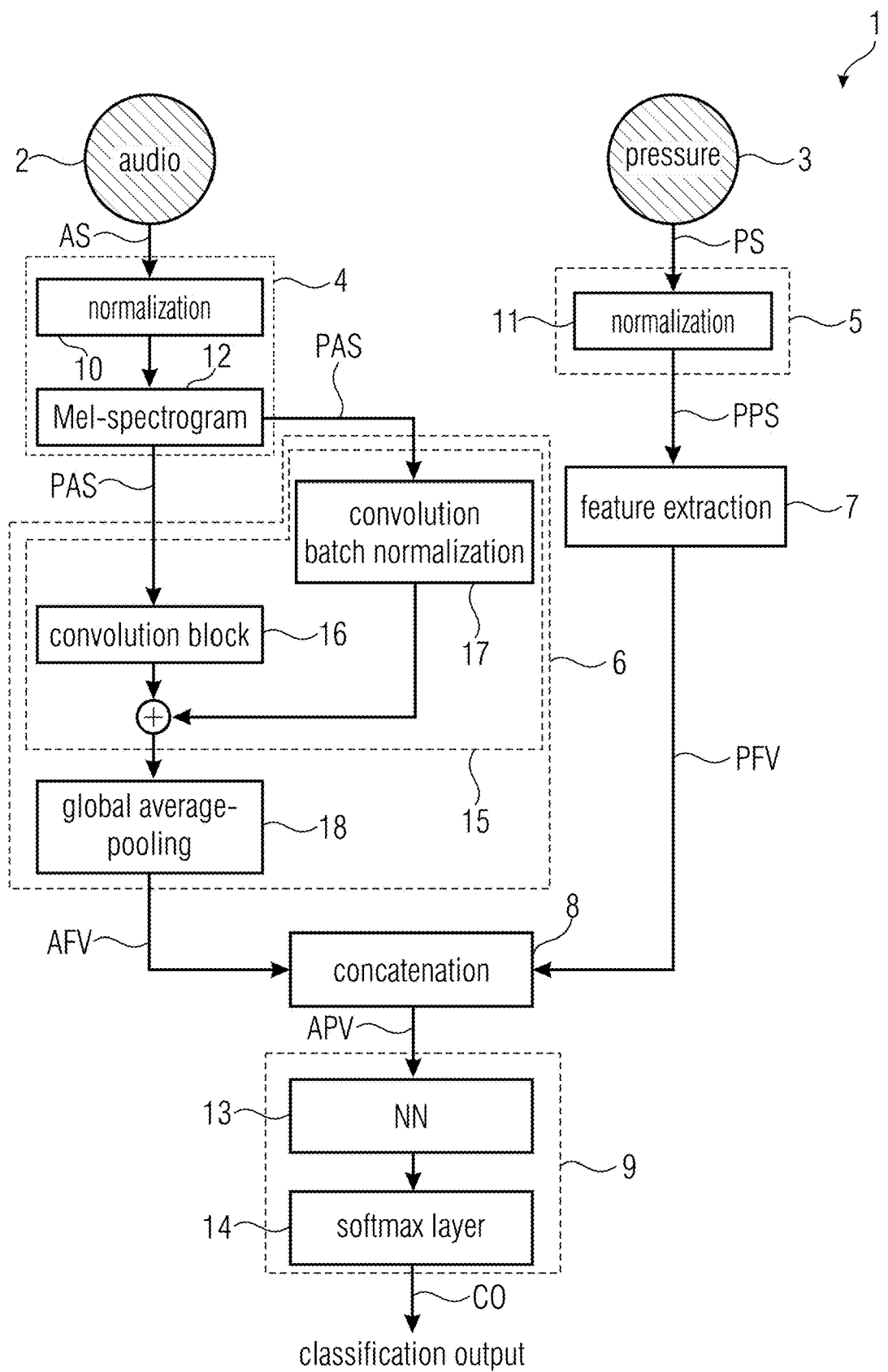
FIG. 2 shows a schematic view of a second embodiment of a classification system for classifying an external impact on a window or on an access opening of an enclosed structure according to the disclosure.

FIG. 2 shows a schematic view of a second embodiment of a classification system 1 for classifying an external impact on a window or on an access opening of an enclosed structure according to the disclosure.

According to some embodiments the audio signal pre-processor 4 comprises an audio signal normalization processor 10 configured for normalizing the audio signal AS, and/or the pressure signal pre-processor 5 comprises a pressure signal normalization processor 11 configured for normalizing the pressure signal PS.

According to some embodiments the audio signal pre-processor 4 comprises an audio signal converter processor 12 configured for providing the pre-processed audio signal PAS as two-dimensional pre-processed audio signal time-frequency maps.

According to some embodiments the first machine learning algorithm is implemented as a first artificial neural network 13, wherein the classification processor 9 comprises a softmax processor 14, which is arranged at an output side of the first artificial neural network 13, and which outputs the classification output CO.

According to some embodiments the audio signal feature processor 4 is configured for executing a second machine learning algorithm, wherein at least a second portion of the audio feature vector AFV is provided at an output layer of the second machine learning algorithm.

According to some embodiments the second machine learning algorithm is implemented as a second artificial neural network 15.

According to some embodiments the second artificial neural network 15 comprises at least one second convolution processor 16.

According to some embodiments the second artificial neural network 15 comprises at least one second convolution batch normalization processor 17.

According to some embodiments the audio signal feature processor 6 comprises at least one second pooling layer processor 18 at an output side of the second artificial neural network 15.

The first pre-processing step may consist for both the audio signal AS and the pressure signal PS in data normalization. Afterwards, the mel scaled spectrogram may be calculated for the audio signal AS. The audio spectrogram may comprise 40 mel coefficients with a windows size of 40 ms and an overlap of 20 ms. Clearly, other combinations of window size, overlap and number of mels are possible.

For the pressure signal PS maximum, minimum and mean value may be extracted as metrics, as well as the dynamic moments and the dynamic moments of the first derivative. Other metrics or meta features like kurtosis, skewness, quantile shall also be considered.

As far as the audio signal is concerned, features are learned out of the pre-processed audio signal PAS in the form of an audio time-frequency representation with the second neural network 15. This consists of the combination of a convolution processor 16 and a convolution batch normalization processor 17. Here, the convolution batch normalization processor 16 indicates a shortcut, where the same pre-processed audio signal PAS going into the convolution processor 16 is used as an input for the convolution batch normalization processor 17. This shall improve the convergence of the second artificial network 15. A second pooling layer processor 18 shapes the output of the second neural network 15 to a 1D array.

The calculated pressure features and the trained audio features are then concatenated and fed to a feedforward neural network 13 followed by a softmax processor 14 that eventually delivers the classification probabilities.

Figure 3:
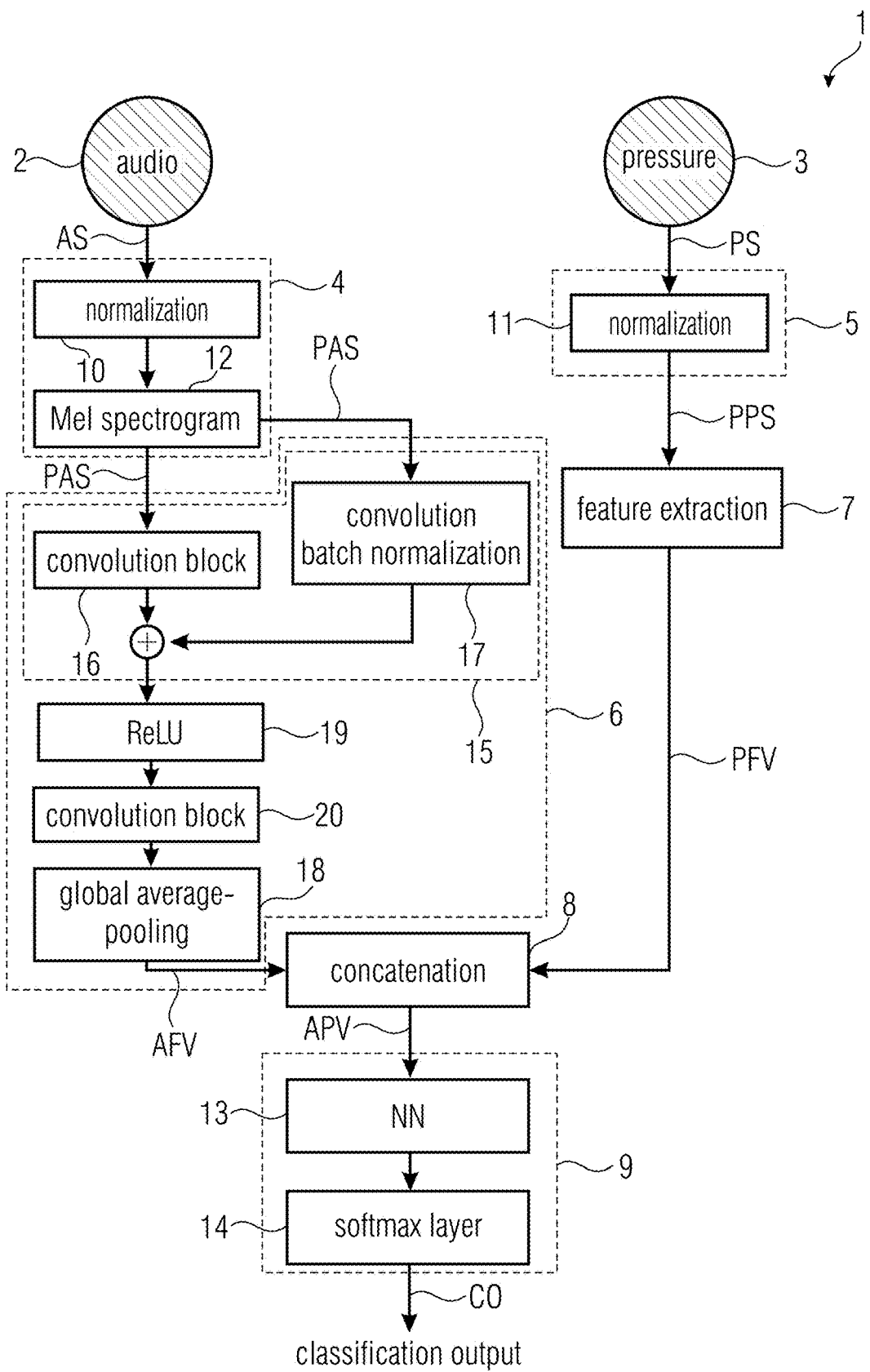
FIG. 3 shows a schematic view of a third embodiment of a classification system for classifying an external impact on a window or on an access opening of an enclosed structure according to the disclosure.

FIG. 3 shows a schematic view of a third embodiment of a classification system 1 for classifying an external impact on a window or on an access opening of an enclosed structure according to the disclosure.

According to some embodiments the audio signal feature processor 6 comprises at least one third rectified linear unit processor 19 at an output side of the second artificial neural network 15.

According to some embodiments the audio signal feature processor 6 comprises at least one fourth convolution processor 20 at an output side of the second artificial neural network 15.

In FIG. 3 the combination of the convolution processor 16 and the convolution batch normalization processor 16 is followed by a third rectified linear unit processor 19 and a fourth convolution processor 20. A second pooling layer processor 18 shapes the output of the second convolution processor 16 to a 1D array.

Figure 4:
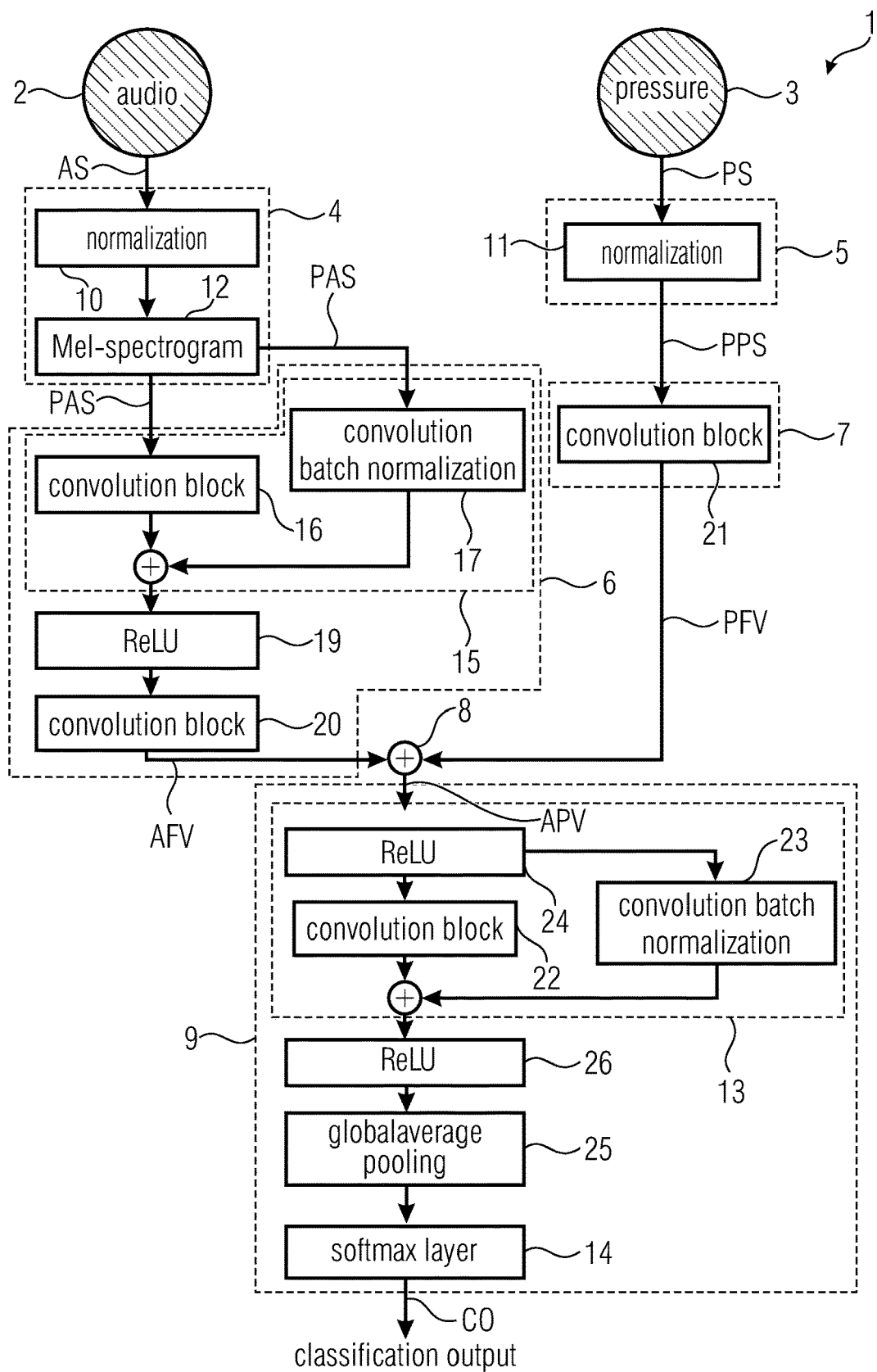
FIG. 4 shows a schematic view of a fourth embodiment of a classification system for classifying an external impact on a window or on an access opening of an enclosed structure according to the disclosure.

FIG. 4 shows a schematic view of a fourth embodiment of a classification system 1 for classifying an external impact on a window or on an access opening of an enclosed structure according to the disclosure.

According to some embodiments the pressure signal feature processor 6 is configured for executing a third machine learning algorithm, wherein at least a second portion of the pressure feature vector PFV is provided at an output layer of the third machine learning algorithm.

According to some embodiments the third machine learning algorithm is implemented as a third artificial neural network 21.

According to some embodiments the third artificial neural network 21 comprises at least one third convolution processor.

According to some embodiments the pressure signal feature processor 7 comprises at least one third pooling layer processor at an output side of the third artificial neural network 21.

According to some embodiments the pressure signal feature processor 7 comprises at least one fourth rectified linear unit processor at an output side of the third artificial neural network 21.

According to some embodiments the pressure signal feature processor 7 comprises at least one fifth convolution processor at an output side of the third artificial neural network.

According to some embodiments the pressure signal feature processor 7 comprises at least one fifth convolution processor at an output side of the third artificial neural network.

According to some embodiments the first artificial neural network 13 comprises at least one first convolution processor 22.

According to some embodiments the first artificial neural network 13 comprises at least one first convolution batch normalization processor 23.

According to some embodiments the first artificial neural network 13 comprises at least one first rectified linear unit processor 24.

According to some embodiments the classification processor 9 comprises at least one first pooling layer processor 25, which is arranged at the output side of the first artificial neural network 13.

According to some embodiments the classification processor 9 comprises at least one second rectified linear unit processor 26, which is arranged at the output side of the first artificial neural network 13.

In FIG. 4 the pressure signal PS is normalized in order to create the preprocessed pressure signal PPS. The pressure feature vector PVF is learned from the preprocessed pressure signal PPS by a third artificial neural network 21. For the audio signal AS, the same approach as in the previous embodiment is implemented.

The outputs of the audio signal feature processor 6 and the pressure signal feature processor 7 are added and then fed to the first neural network 13, which consists of a second rectified linear unit processor 26, a first convolution processor 22 and a first convolution batch normalization processor 23. The sum of the output of the first convolution processor 22 and the first convolution batch normalization processor 23 are input to a second rectified linear unit processor 26 followed by the first pooling layer processor 25 and by the softmax processor 14 for generating the classification output CO.

Figure 5:
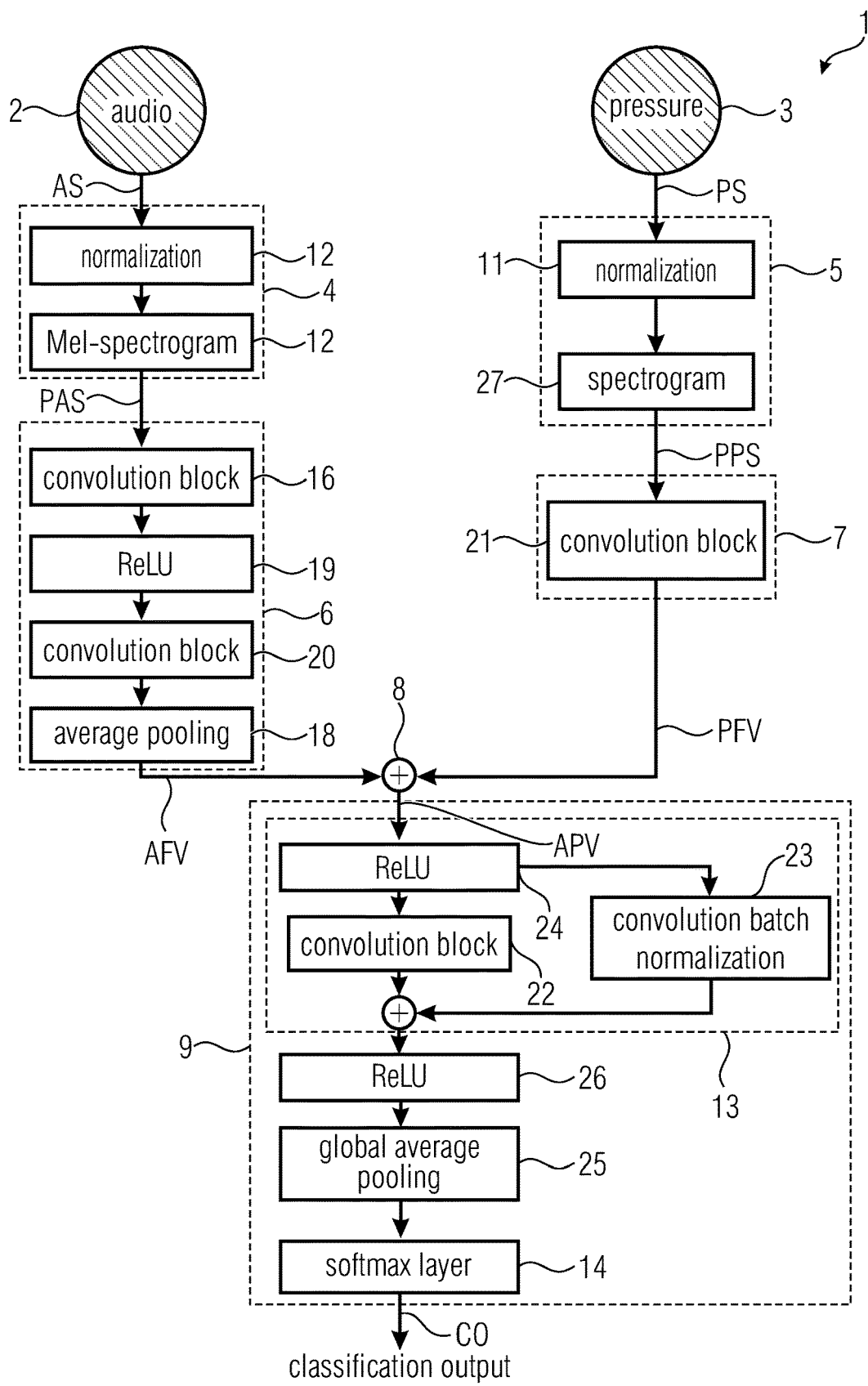
FIG. 5 shows a schematic view of a fifth embodiment of a classification system for classifying an external impact on a window or on an access opening of an enclosed structure to the disclosure.

FIG. 5 shows a schematic view of a fifth embodiment of a classification system 1 for classifying an external impact on a window or on an access opening of an enclosed structure to the disclosure.

According to some embodiments the pressure signal pre-processor 5 comprises a pressure signal converter processor 27 configured for providing the pre-processed pressure signal PPS as two-dimensional pre-processed pressure signal time-frequency maps.

A further possible embodiment is depicted in FIG. 5. The pressure signal PS and the audio signal AS are normalized and spectrograms are calculated. The spectrogram from the pressure signal PS is calculated with FFTs, which are concatenated over a shifted window. In this embodiment, no convolution batch normalization processor is used in the audio signal feature processor 6, only after the feature combining processor 8. In addition, a second pooling layer processor 18 is needed after the fourth convolution processor 20 to be able to combine the audio feature vector AFV with the learned pressure feature vector PFV from the pressure signal feature processor 7. After combining the learned features vectors AFV and PFV, the same network architecture as in FIG. 4 is adopted for the classification processor 9 to obtain the classification output CO.

Figure 6:
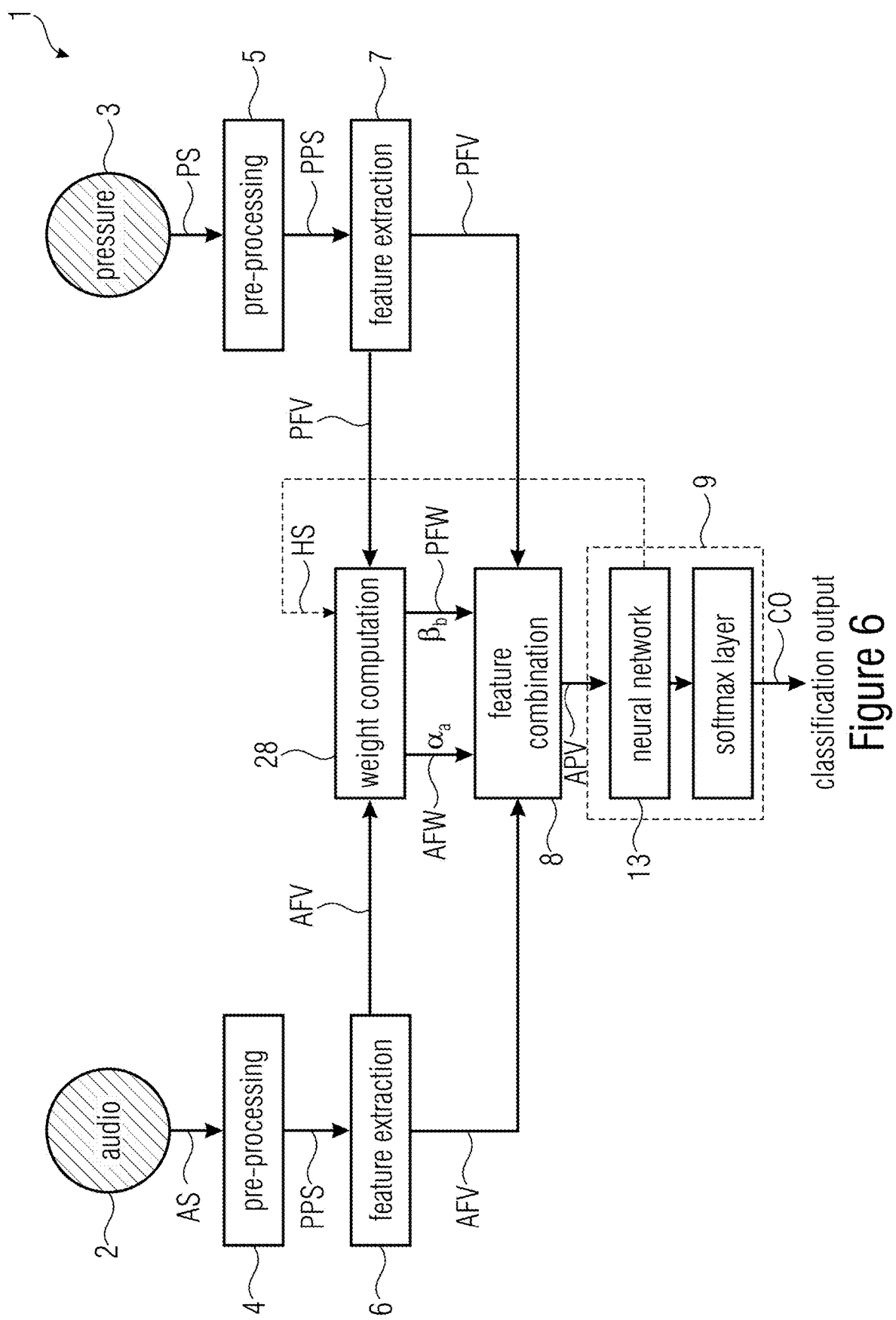
FIG. 6 shows a schematic view of a sixth embodiment of a classification system for classifying an external impact on a window or on an access opening of an enclosed structure to the disclosure.

FIG. 6 shows a schematic view of a sixth embodiment of a classification system 1 for classifying an external impact on a window or on an access opening of an enclosed structure to the disclosure.

According to some embodiments the feature combining processor 8 is configured for producing the audio feature and pressure feature vector APV by producing a weighted concatenation or a weighted sum or a weighted elementwise multiplication of the audio feature vector AFV and the pressure feature vector PVF, wherein, by a weight computation processor 28, a weight AFW for the audio feature vector AFV and a weight PFW for the pressure feature vector PFV is determined depending on the audio feature vector AFV and/or the pressure feature vector PFV.

According to some embodiments the feature combining processor 8 is configured for producing the audio feature and pressure feature vector APV by producing a weighted concatenation or a weighted sum or a weighted elementwise multiplication of the audio feature vector AFV and the pressure feature vector PFV, wherein, by a weight computation processor 28, a weight AFW for the audio feature vector AFW and a weight PFW for the pressure feature vector PFV is determined depending on a hidden state HS of the first artificial neural network 13.

According to some embodiments the feature combining processor 8 is configured for adding a first offset vector to the audio feature vector AFV and/or a second offset vector to the pressure feature vector PFV before producing the audio feature and pressure feature vector APV, wherein the first offset vector and/or the second offset vector are determined depending on the audio feature vector AFV and/or the pressure feature vector PFV.

According to some embodiments the feature combining processor 8 is configured for adding a first offset vector to the audio feature vector AFV and/or a second offset vector to the pressure feature vector PFV before producing the audio feature and pressure feature vector APV, wherein the first offset vector and/or the second offset vector are determined depending on a hidden state HS of the first artificial neural network 13.

The weights and offsets can be learned by a standard back-propagation algorithm and gradient descent implemented as a multilayer perceptron network or by making use of more complex attention mechanism which takes the features (and hidden state of the following classification network if available) as inputs as illustrated in FIG. 6.

As far as the weights (and the offsets) of the feature combining processor 8 are concerned, they could be learned directly or they could be obtained with an attention-like mechanism where we first calculate the score $e_i$ and then take the softmax for normalization $$[e_1, \ldots, e_N] = \tan h(V[F_a(1), \ldots, F_b(N), H] + b) \quad (1)$$

$$\alpha_i = \text{softmax}(e_i) \quad (2)$$

with H being the hidden state of the global network if available, V and b being the parameters matrix and vector to be learned and $\alpha_i$ being the final weight associated to the pre-processed feature.

Alternatively, one could directly optimize the following:

$$[\alpha_1, \ldots, \alpha_N] = \text{softmax}(V[F_a(1), \ldots, F_b(N), H] + b) \quad (3)$$

It should be noted that the individual networks in (1) and (2) and their hyper-parameters are jointly trained with their respective global network architecture, so that the overall loss function is minimized.

In addition, it should be noted that H in equation (1) and (3) is optional and will be part of the optimization when a previous hidden state is available. This happens for example when a recurrent neural network is deployed in place of a convolutional one as the first neural network 13.

Figure 7:
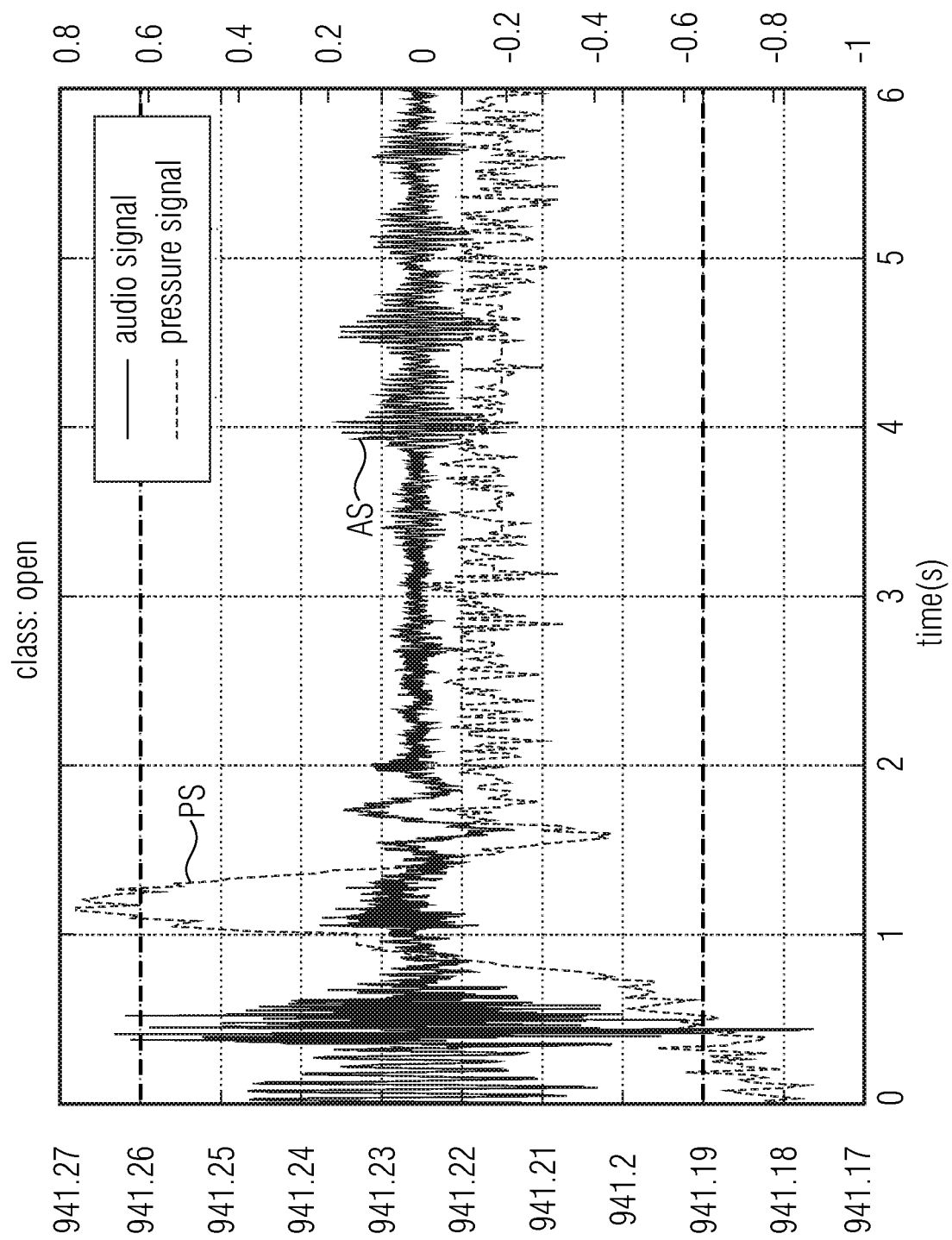
FIG. 7 shows a typical pressure signal over time and a typical audio signal over time, when a glass window is being opened.

FIG. 7 shows a typical pressure signal PS over time and a typical audio signal AS over time, when a glass window is being opened.

Figure 8:
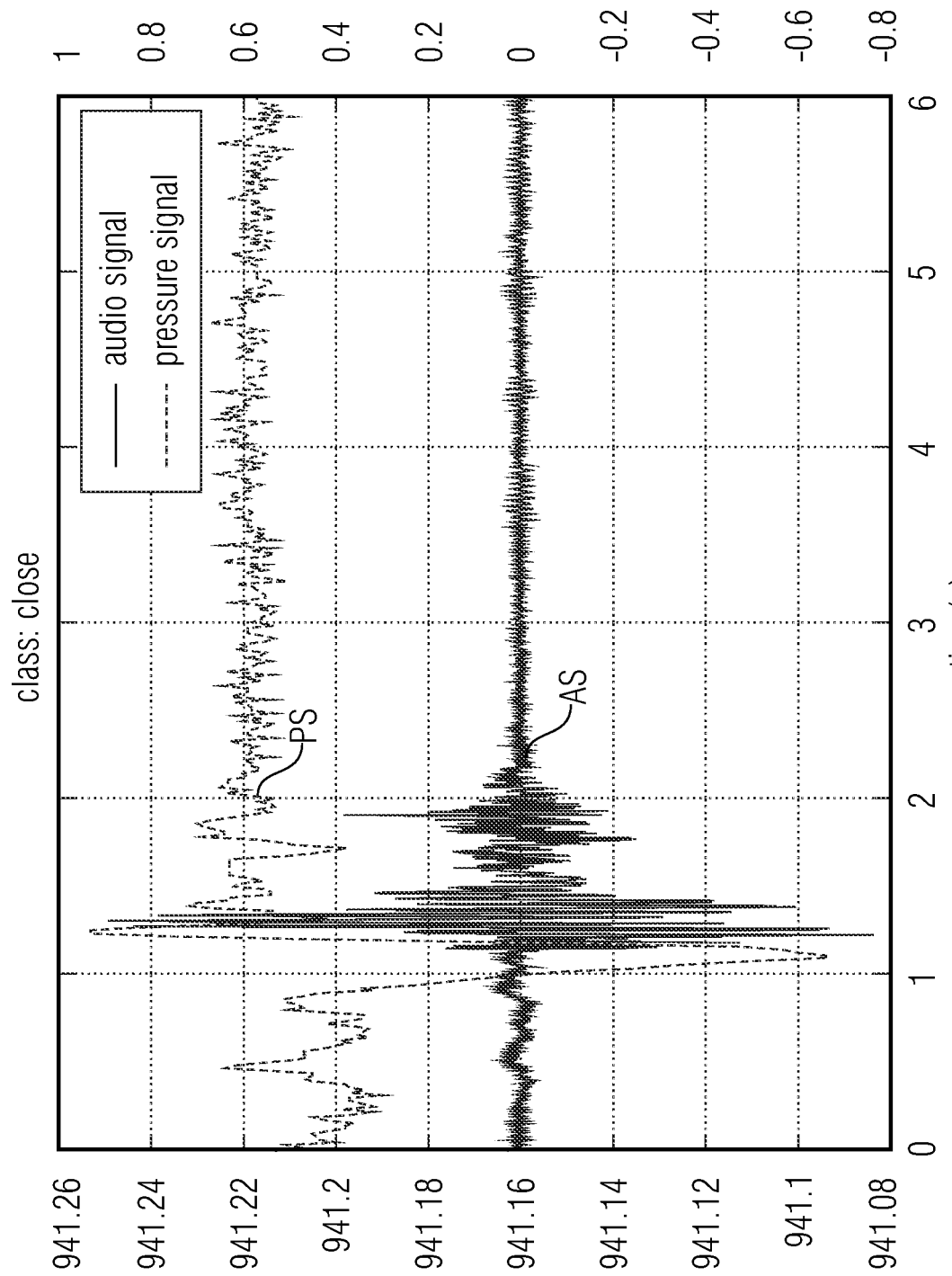
FIG. 8 shows a typical pressure signal over time and a typical audio signal over time, when a glass window is being closed.

FIG. 8 shows a typical pressure signal PS over time and a typical audio signal AS over time, when a glass window is being closed.

Figure 9:
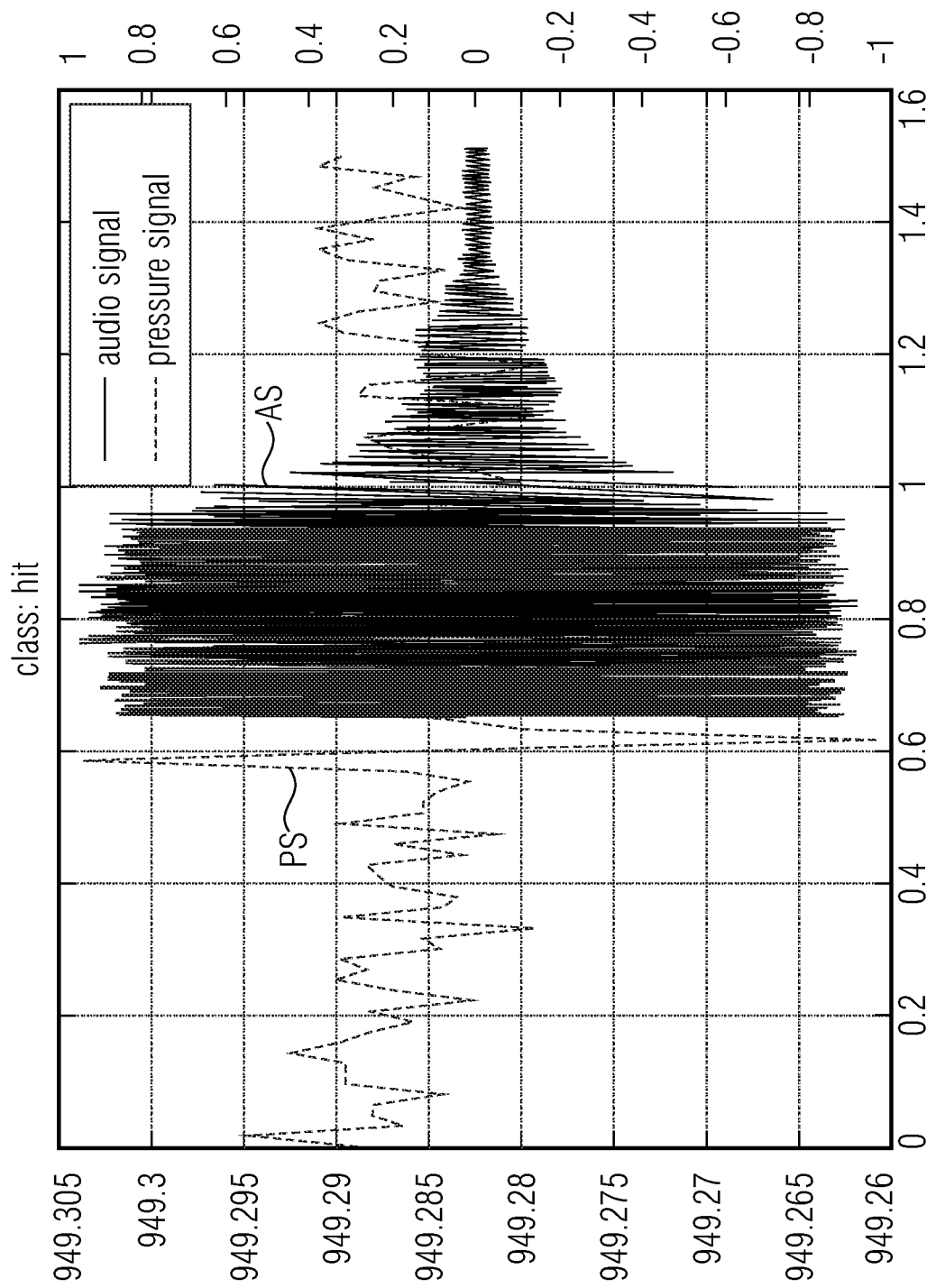
FIG. 9 shows a typical pressure signal over time and a typical audio signal over time, when a glass window is being hit.

FIG. 9 shows a typical pressure signal PS over time and a typical audio signal AS over time, when a glass window is being hit.

Figure 10:
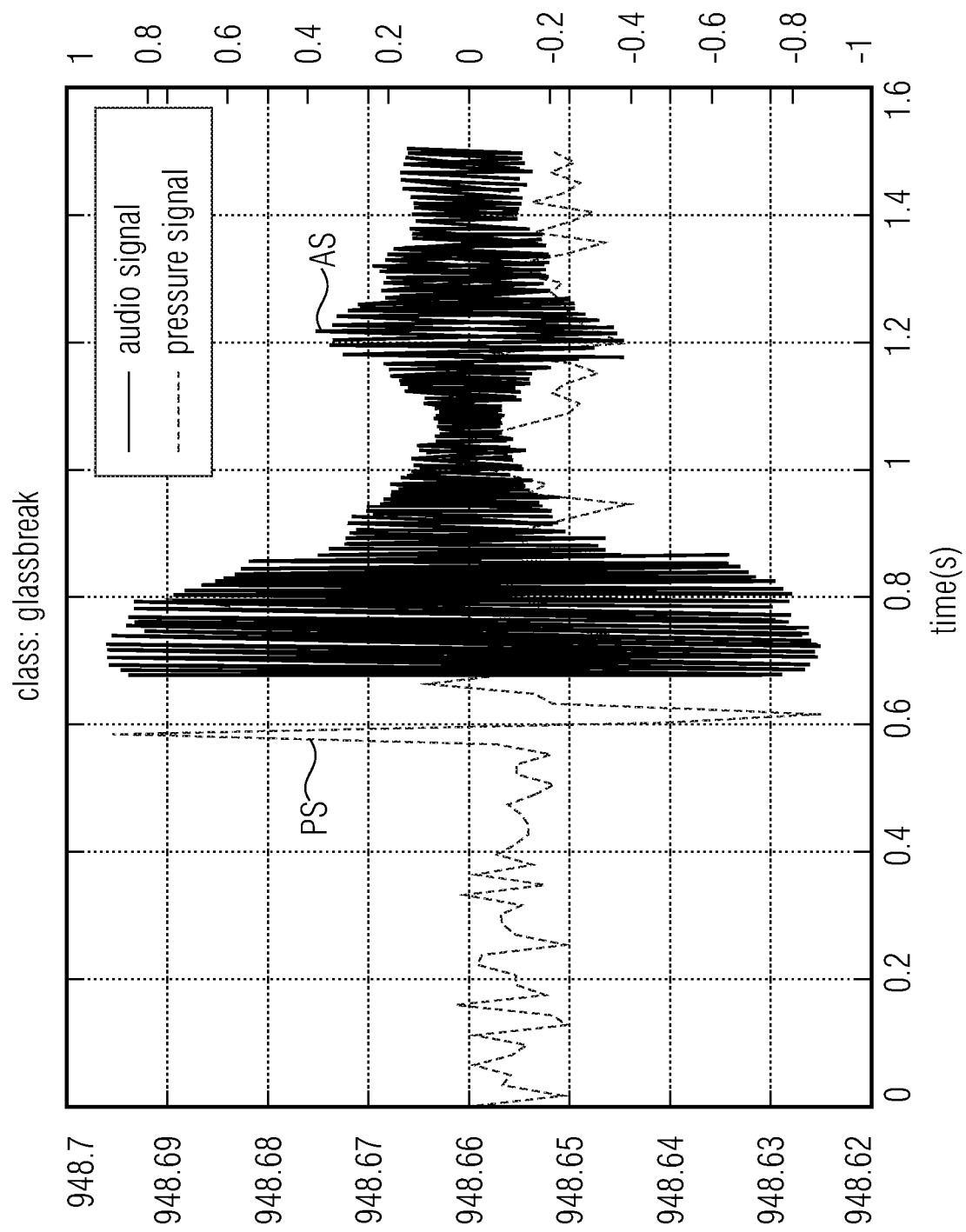
FIG. 10 shows a typical pressure signal over time and a typical audio signal over time, when a glass window is being broken.

FIG. 10 shows a typical pressure signal PS over time and a typical audio signal AS over time, when a glass window is being broken.

Figure 11:
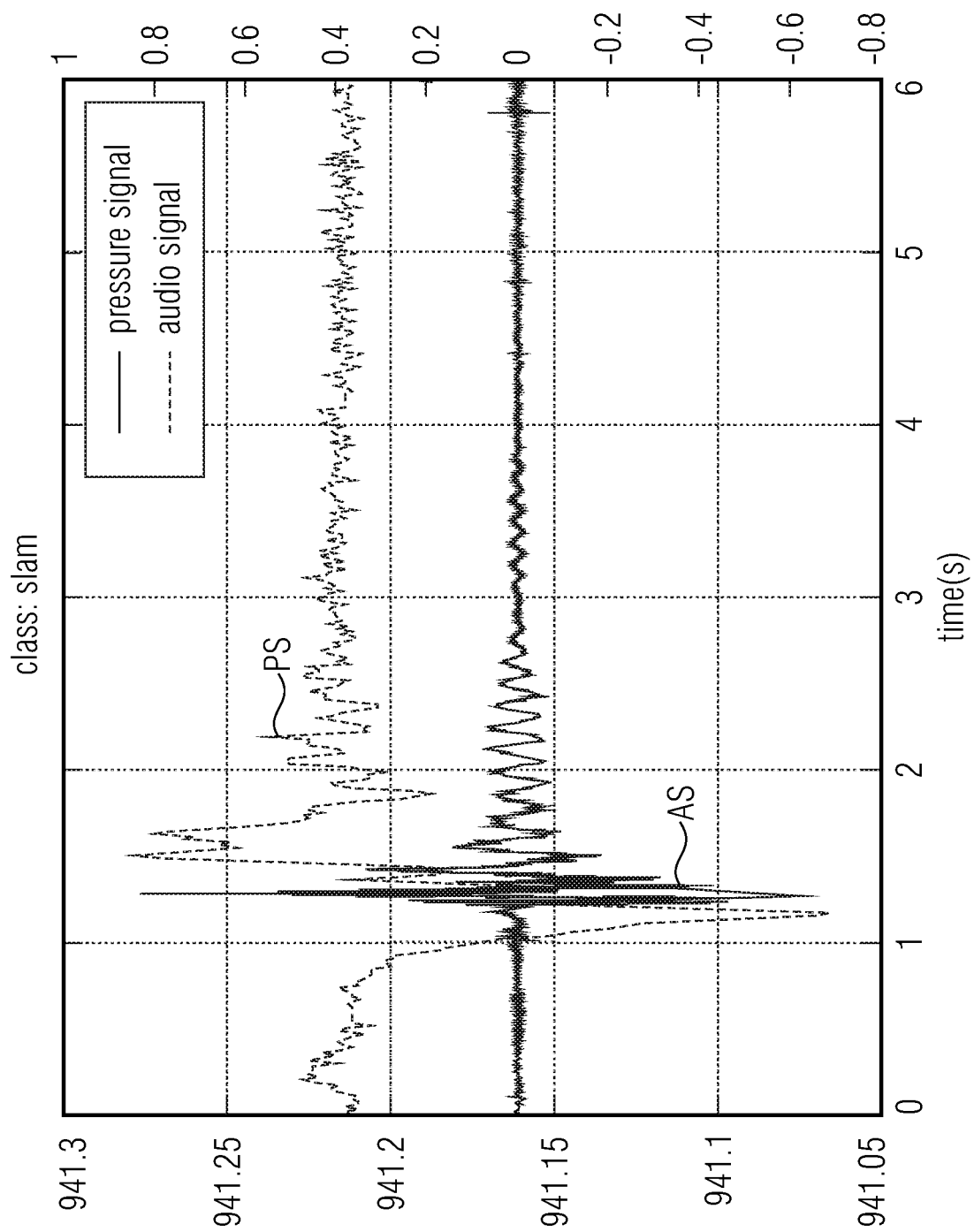
FIG. 11 shows a typical pressure signal over time and a typical audio signal over time, when a glass window is being slammed.

FIG. 11 shows a typical pressure signal PS over time and a typical audio signal AS over time, when a glass window is being slammed.

FIGS. 7 to 11 are showing some typical signals measured at the pressure sensor and microphone when different types of events occur. It can be seen that the signals below have a very distinctive pattern depending on whether the glass window is being opened, closed, hit, slammed or broken. Also, it can be observed that the audio signals AS and the pressure signals PS are quite different in their properties with the audio signal AS having very specific patterns for slamming, hitting and glass breaking and the pressure signal PS having more distinctive behavior when trying to separate the open/close event. Similar considerations can be done by observing the frequency spectra of the different classes.

Figure 12:
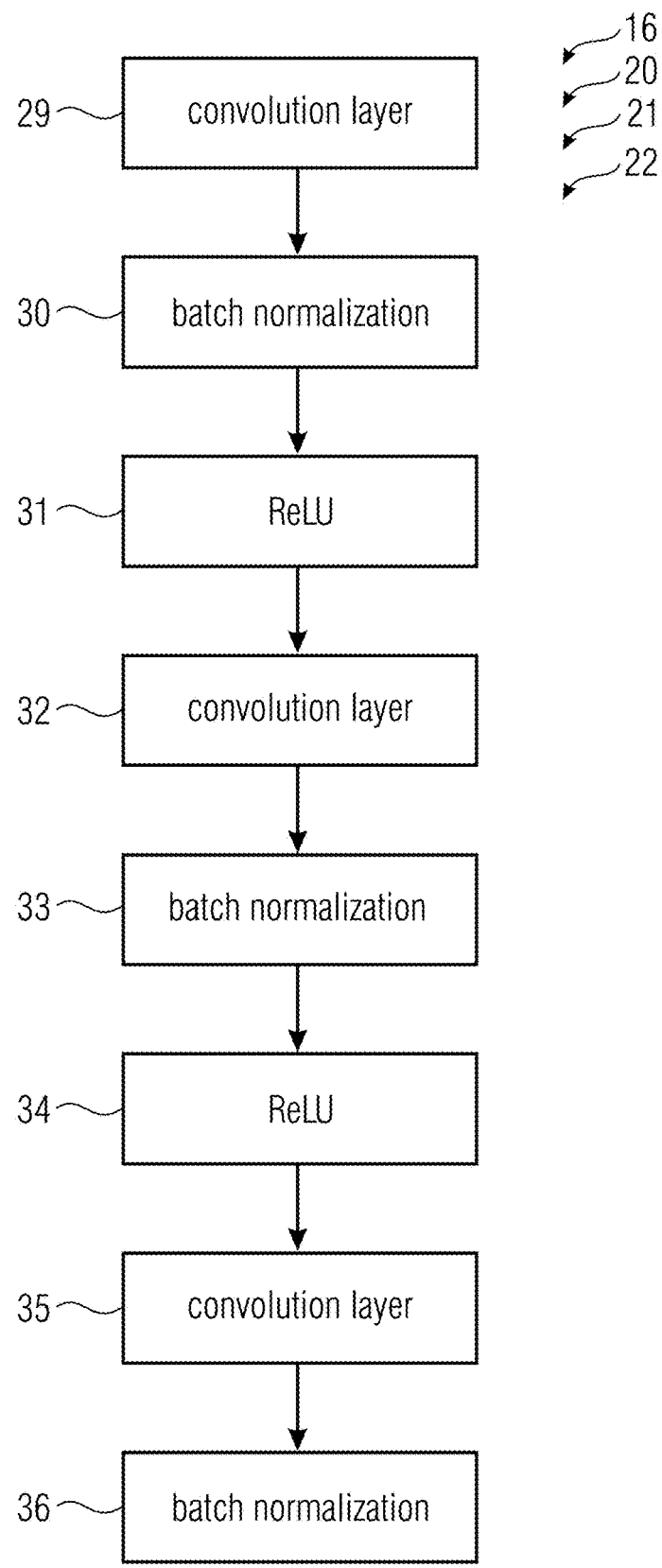
FIG. 12 shows a possible implementation for the convolution processors described herein.

FIG. 12 shows a possible implementation for the convolution processors 16, 20, 21 and 22 described herein. Each of the convolution processors 16, 20, 21 and 22 explained in this disclosure may comprise (in this order) the following subunits: a first convolution layer 29 comprising eight two-dimensional Kernels, a first batch normalization layer 30, a first rectified linear layer 31, a second convolution layer 32 comprising five two-dimensional Kernels, a second batch normalization layer 33, a second rectified linear layer 34, a third convolution layer 35 comprising three two-dimensional Kernels, and a third batch normalization layer 36.

In Table 1 a comparison of single stream and multi stream approaches is itemized. It could be seen, that the simple AND combination of a pressure algorithm and an audio algorithm already gives a better performance than each algorithm itself. Nevertheless, the smart multi-stream approach described in this disclosure delivers an even better result than using the majority rule in addition to saving computation resources by sharing processing blocks across the different streams. The accuracy of 98% has been achieved with an embodiment of a classification system as described with reference to FIG. 4. However, other embodiments disclosed herein provide similar accuracy.

TABLE 1

Overview algorithm comparison

| Algorithm | Details | Detection Accuracy |
| --- | --- | --- |
| Pressure Only | Only the pressure stream as input to a classification feedforward neural network | 89% |
| Audio Only | Only the audio stream as input for a classification with a CNN | 57% |
| Pressure + Audio logical AND | Using the pressure only and the audio only algorithms separately and combine the classification results with a logical AND | 93% |
| Pressure + Audio smart Fusion | Using the described embodiment from FIG. 4 | 98% |

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The above described is merely illustrative, and it is understood that modifications and variations of the arrangements and the details described herein will be apparent to others skilled in the art. It is the intent, therefore, to be limited only by the scope of the impending claims and not by the specific details presented by way of description and explanation above.

What is claimed is:

1. A classification system for classifying an external impact on a window or on an access opening of an enclosed structure, the classification system comprising:
    a microphone configured for producing an audio signal corresponding to a sound within the enclosed structure;
    a barometric pressure sensor configured for producing a pressure signal corresponding to an air pressure within the enclosed structure;
    an audio signal pre-processor configured for deriving a pre-processed audio signal from the audio signal;
    a pressure signal pre-processor configured for deriving a pre-processed pressure signal from the pressure signal;
    an audio signal feature processor configured for extracting audio features from the pre-processed audio signal in order to produce an audio feature vector using an audio feature extraction artificial neural network;
    a pressure signal feature processor configured for extracting pressure features from the pre-processed pressure signal in order to produce a pressure feature vector;
    a feature combining processor configured for combining the audio feature vector and the pressure feature vector in order to produce an audio feature and pressure feature vector; and
    a classification processor configured for classifying the external impact on the window or the access opening by classifying the audio feature and pressure feature vector in order to produce a classification output indicative of the external impact on the window or on the access opening in real time,
    wherein the classification processor is configured for executing a first machine learning algorithm, wherein the audio feature and pressure feature vector is fed to an input layer of the first machine learning algorithm, and wherein the classification output is based on an output of the first machine learning algorithm, wherein the first machine learning algorithm is separate from the audio feature extraction artificial neural network,
    wherein the audio signal pre-processor, the pressure signal pre-processor, the audio signal feature processor, the pressure signal feature processor, the feature combining processor, and the classification processor are implemented using at least one processor circuit, and
    wherein the audio signal, the pressure signal, the pre-processed audio signal, the pre-processed pressure signal, the audio feature vector, the pressure feature vector, the audio feature and pressure feature vector, and the classification output are electronic signals.

2. The classification system according to claim 1, wherein the audio signal pre-processor comprises an audio signal normalization processor configured for normalizing the audio signal, and/or wherein the pressure signal pre-processor comprises a pressure signal normalization processor configured for normalizing the pressure signal.

3. The classification system according to claim 1, wherein the audio signal pre-processor comprises an audio signal filter configured for filtering the audio signal, and/or wherein the pressure signal pre-processor comprises a pressure signal filter configured for filtering the pressure signal.

4. The classification system according to claim 1, wherein the audio signal pre-processor comprises an audio signal outlier removing processor configured for removing outliers from the audio signal, and/or wherein the pressure signal pre-processor comprises a pressure signal outlier removing processor configured for removing outliers from the pressure signal.

5. The classification system according to claim 1, wherein the audio signal pre-processor comprises an audio signal converter processor configured for providing the pre-processed audio signal as two-dimensional pre-processed audio signal time-frequency maps, and/or wherein the pressure signal pre-processor comprises a pressure signal converter processor configured for providing the pre-processed pressure signal as two-dimensional pre-processed pressure signal time-frequency maps.

6. The classification system according to claim 1, wherein the audio signal feature processor is configured for performing calculations for deriving the audio feature vector by using one or more first explicit formulas, and/or wherein the pressure signal feature processor is configured for performing calculations for deriving the pressure feature vector by using one or more second explicit formulas.

7. The classification system according to claim 1, wherein the first machine learning algorithm is implemented as a first artificial neural network, and wherein the classification processor comprises a softmax processor, which is arranged at an output side of the first artificial neural network as a final layer of the first artificial neural network, and which outputs the classification output.

8. The classification system according to claim 7, wherein the first artificial neural network comprises at least one first convolution processor.

9. The classification system according to claim 7, wherein the first artificial neural network comprises at least one first convolution batch normalization processor.

10. The classification system according to claim 7, wherein the first artificial neural network comprises at least one first rectified linear unit processor.

11. The classification system according to claim 7, wherein the classification processor comprises at least one first pooling layer processor, which is arranged at the output side of the first artificial neural network, wherein the at least one first pooling layer processor shapes an input to a one-dimensional (1D) array.

12. The classification system according to claim 7, wherein the classification processor comprises at least one second rectified linear unit processor, which is arranged at the output side of the first artificial neural network.

13. The classification system according to claim 7, wherein the audio feature vector comprises values of the audio features, which are characteristic for the audio signal, and
wherein the pressure feature vector comprises values of the pressure features, which are characteristic for the pressure signal,
wherein the feature combining processor is configured for producing the audio feature and pressure feature vector by producing a weighted concatenation or a weighted sum or a weighted elementwise multiplication of the audio feature vector and the pressure feature vector, and
wherein, by a weight computation processor, a weight for the audio feature vector and a weight for the pressure feature vector are determined based on the audio features and the pressure features such that a higher weight is allocated to the audio feature vector based on the audio features being more distinctive than the pressure features, or such that a higher weight is allocated to the pressure feature vector based on the pressure features being more distinctive than the audio features.

14. The classification system according to claim 7, wherein the feature combining processor is configured for adding a first offset vector to the audio feature vector and/or adding a second offset vector to the pressure feature vector before producing the audio feature and pressure feature vector, wherein the first offset vector and/or the second offset vector are determined depending on a hidden state of the first artificial neural network.

15. The classification system according claim 1, wherein the audio signal feature processor is configured for executing a second machine learning algorithm, wherein the audio feature vector is provided at an output layer of the second machine learning algorithm, and/or wherein the pressure signal feature processor is configured for executing a third machine learning algorithm, wherein the pressure feature vector is provided at an output layer of the third machine learning algorithm.

16. The classification system according claim 15, wherein the second machine learning algorithm is implemented as a second artificial neural network, and/or wherein the third machine learning algorithm is implemented as a third artificial neural network.

17. The classification system according to claim 16, wherein the second artificial neural network comprises at least one second convolution processor, and/or the third artificial neural network comprises at least one third convolution processor.

18. The classification system according to claim 16, wherein the second artificial neural network comprises at least one second convolution batch normalization processor, and/or wherein the third artificial neural network comprises at least one third convolution batch normalization processor.

19. The classification system according to claim 16, wherein the audio signal feature processor comprises at least one second pooling layer processor at an output side of the second artificial neural network, and/or wherein the pressure signal feature processor comprises at least one third pooling layer processor at an output side of the third artificial neural network.

20. The classification system according to claim 16, wherein the audio signal feature processor comprises at least one third rectified linear unit processor at an output side of the second artificial neural network, and/or wherein the pressure signal feature processor comprises at least one fourth rectified linear unit processor at an output side of the third artificial neural network.

21. The classification system according to claim 16, wherein the audio signal feature processor comprises at least one fourth convolution processor at an output side of the second artificial neural network, and/or wherein the pressure signal feature processor comprises at least one fifth convolution processor at an output side of the third artificial neural network.

22. The classification system according to claim 1, wherein the audio feature vector comprises values of the audio features, which are characteristic for the audio signal,
wherein the pressure feature vector comprises values of the pressure features, which are characteristic for the pressure signal, and
wherein the feature combining processor is configured for producing the audio feature and pressure feature vector by producing a concatenation or a sum or an elementwise multiplication of the audio feature vector and the pressure feature vector.

23. The classification system according to claim 1, wherein the audio feature vector comprises values of the audio features, which are characteristic for the audio signal,
wherein the pressure feature vector comprises values of the pressure features, which are characteristic for the pressure signal, and
wherein the feature combining processor is configured for producing the audio feature and pressure feature vector by producing a weighted concatenation or a weighted sum or a weighted elementwise multiplication of the audio feature vector and the pressure feature vector,
wherein, by a weight computation processor, a weight for the audio feature vector and a weight for the pressure feature vector is determined depending on the audio feature vector and/or the pressure feature vector.

24. The classification system according to claim 1, wherein the audio feature vector comprises values of the audio features, which are characteristic for the audio signal,
wherein the pressure feature vector comprises values of the pressure features, which are characteristic for the pressure signal, and
wherein the feature combining processor is configured for adding a first offset vector to the audio feature vector and/or a second offset vector to the pressure feature vector before producing the audio feature and pressure feature vector, wherein the first offset vector and/or the second offset vector are determined depending on the audio feature vector and/or the pressure feature vector.

25. The classification system according to claim 1, wherein the pressure signal feature processor is configured to produce the pressure feature vector using a pressure feature vector extraction artificial neural network separate from the audio feature extraction artificial neural network, and separate from the first machine learning algorithm.

26. The classification system according to claim 13, wherein the weight computation processor is configured to determine the weight for the audio feature vector and the weight for the pressure feature vector based on a hidden state of the first artificial neural network.

27. The classification system according to claim 7, wherein the audio feature vector comprises values of the audio features, which are characteristic for the audio signal,
 wherein the pressure feature vector comprises values of the pressure features, which are characteristic for the pressure signal, and
 wherein the feature combining processor is configured for producing the audio feature and pressure feature vector by producing a weighted concatenation or a weighted sum or a weighted elementwise multiplication of the audio feature vector and the pressure feature vector, wherein, by a weight computation processor, a weight for the audio feature vector and a weight for the pressure feature vector are learned based the audio features and the pressure features provided as inputs to a back-propagation algorithm.

28. The classification system according to claim 1, wherein the audio features include at least a maximum value, a minimum value, and a mean value.

29. The classification system according to claim 1, wherein the audio features include dynamic moments and dynamic moments of a first derivative.

30. The classification system according to claim 1, wherein the audio feature extraction artificial neural network comprises a first convolution processor and a convolution batch normalization processor, and
 wherein the first convolution processor and the convolution batch normalization processor both receive the pre-processed audio signal as inputs, and an output of the first convolution processor is combined with an output of the convolution batch normalization processor to generate a combined output for extracting the audio features from the pre-processed audio signal.

31. The classification system according to claim 30, wherein the audio signal feature processor comprises a rectified linear unit processor at an output side of the audio feature extraction artificial neural network, the rectified linear unit processor being configured to receive the combined output, and
 wherein the audio signal feature processor comprises a second convolution processor at the output side of the audio feature extraction artificial neural network and coupled to an output of the rectified linear unit processor, the second convolution processor configured to output the audio feature vector.

32. The classification system according to claim 1, wherein the audio feature vector comprises values of the audio features, which are characteristic for the audio signal, and
 wherein the pressure feature vector comprises values of the pressure features, which are characteristic for the pressure signal.

33. A method for classifying an external impact on a window or on an access opening of an enclosed structure, the method comprising:
 producing an audio signal corresponding to a sound within the enclosed structure by using a microphone;
 producing a pressure signal corresponding to an air pressure within the enclosed structure by using a barometric pressure sensor;
 deriving a pre-processed audio signal from the audio signal by using an audio signal pre-processor;
 deriving a pre-processed pressure signal from the pressure signal by using a pressure signal pre-processor;
 extracting audio features from the pre-processed audio signal by using an audio signal feature processor in order to produce an audio feature vector using an audio feature extraction artificial neural network;
 extracting pressure features from the pre-processed pressure signal by using a pressure signal feature processor in order to produce a pressure feature vector;
 combining the audio feature vector and the pressure feature vector by using a feature combining processor in order to produce an audio feature and pressure feature vector; and
 classifying the external impact on the window or the access opening by classifying the audio feature and pressure feature vector by using a classification processor in order to produce a classification output indicative of the external impact on the window or on the access opening in real time,
 wherein the classification processor is executing a first machine learning algorithm, wherein the first machine learning algorithm is separate from the audio feature extraction artificial neural network, wherein the audio feature and pressure feature vector is fed to an input layer of the first machine learning algorithm, and wherein the classification output is based on an output of the first machine learning algorithm, and
 wherein the audio signal, the pressure signal, the pre-processed audio signal, the pre-processed pressure signal, the audio feature vector, the pressure feature vector, the audio feature and pressure feature vector, and the classification output are electronic signals.

34. A system comprising:
 an audio signal pre-processor configured to receive an audio signal from a microphone and to derive a pre-processed audio signal from a received audio signal;
 a pressure signal pre-processor configured to receive a pressure signal from a barometric pressure sensor and to derive a pre-processed pressure signal from the received pressure signal;
 an audio signal feature processor configured for extracting audio features from the pre-processed audio signal in order to produce an audio feature vector using an audio feature extraction artificial neural network;
 a pressure signal feature processor configured for extracting pressure features from the pre-processed pressure signal in order to produce a pressure feature vector;
 a feature combining processor configured for combining the audio feature vector and the pressure feature vector in order to produce an audio feature and pressure feature vector; and
 a classification processor configured for classifying an external impact on a window or an access opening of an enclosed structure by classifying the audio feature and pressure feature vector in order to produce a classification output indicative of the external impact on the window or the access opening in real time,
 wherein the classification processor is configured for executing a first machine learning algorithm, wherein the audio feature and pressure feature vector is fed to an input layer of the first machine learning algorithm, and wherein the classification output is based on an output of the first machine learning algorithm, wherein the first machine learning algorithm is separate from the audio feature extraction artificial neural network,
 wherein the audio signal pre-processor, the pressure signal pre-processor, the audio signal feature processor, the pressure signal feature processor, the feature combining processor, and the classification processor are implemented using at least one processor circuit, and wherein the audio signal, the pressure signal, the pre-processed audio signal, the pre-processed pressure signal, the audio feature vector, the pressure feature vector, the audio feature and pressure feature vector, and the classification output are electronic signals.

* * * * *